US011037126B2

(12) United States Patent
Oliveira et al.

(10) Patent No.: US 11,037,126 B2
(45) Date of Patent: Jun. 15, 2021

(54) SYSTEMS AND METHODS FOR ASSESSING ELECTRONIC PAYMENT READINESS

(71) Applicant: VISA INTERNATIONAL SERVICE ASSOCIATION, San Francisco, CA (US)

(72) Inventors: Tania Oliveira, Miami, FL (US); Flaviane Peccin, Miami, FL (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 2 days.

(21) Appl. No.: 16/506,421

(22) Filed: Jul. 9, 2019

(65) Prior Publication Data

US 2021/0012310 A1  Jan. 14, 2021

(51) Int. Cl.
*G06Q 20/22* (2012.01)
*G06Q 20/24* (2012.01)

(52) U.S. Cl.
CPC .......... *G06Q 20/227* (2013.01); *G06Q 20/24* (2013.01)

(58) Field of Classification Search
CPC .......................................... G06Q 10/00–50/00
USPC .................................. 705/7.11–7.42
See application file for complete search history.

(56) References Cited

U.S. PATENT DOCUMENTS

| 9,953,372 | B1 * | 4/2018 | Dziabiak | G06Q 30/02 |
| 10,380,771 | B2 * | 8/2019 | Zhao | G06F 17/175 |
| 10,417,812 | B2 * | 9/2019 | Djorgovski | G06T 15/205 |
| 2010/0332475 | A1 * | 12/2010 | Birdwell | G06F 16/283 |
| | | | | 707/737 |
| 2011/0261049 | A1 * | 10/2011 | Cardno | G06Q 10/10 |
| | | | | 345/419 |
| 2016/0125456 | A1 * | 5/2016 | Wu | G06Q 30/0251 |
| | | | | 705/14.49 |
| 2016/0300252 | A1 * | 10/2016 | Frank | G06F 16/24578 |
| 2019/0325271 | A1 * | 10/2019 | Nair | G06Q 20/3224 |
| 2019/0378207 | A1 * | 12/2019 | Dibner-Dunlap | G06Q 40/02 |

OTHER PUBLICATIONS

Van Hove, Leo, and Farhod P. Karimov. "The role of risk in e-retailers' adoption of payment methods: evidence for transition economies." Electronic Commerce Research 16.1 (2016): 27-72. (Year: 2016).*
Berndt, A. D., S. G. Saunders, and Daniel J. Petzer. "Readiness for banking technologies in developing countries." Southern African business review 14.3 (2010). (Year: 2010).*
Kauffman, Robert J., and Ajay Kumar. "A critical assessment of the capabilities of five measures for ICT development." Available from:< misrc. umn. edu/workingpapers/fullpapers/2005/0506_031805. pdf (2005). (Year: 2005).*

* cited by examiner

Primary Examiner — Alan S Miller
(74) Attorney, Agent, or Firm — Loeb & Loeb, LLP

(57) ABSTRACT

A computer-implemented method for extracting data related to various geographically specific dimensions, determining weight dimensions for those dimensions, and generating a general readiness index that may indicate a level of electronic payment readiness for a geographical region. The method may include, in some embodiments, determining a recommended course of action associated with the geographical area.

19 Claims, 10 Drawing Sheets

SYSTEMS AND METHODS FOR ASSESSING ELECTRONIC PAYMENT READINESS

FIELD OF THE INVENTION

The invention relates to systems and methods for providing assessments of electronic payment readiness for a region.

BACKGROUND

Cities, towns, and other geographical regions may exist in varying stages of readiness for adaption of electronic payments. Some areas where electronic payment is not common may be ready for adoption, while others may still need additional time to develop to a point where electronic payments could be readily adopted. Companies or other entities looking to provide electronic payment options to various regions may benefit from an accurate assessment about which geographic regions are most ready to adopt electronic payments.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Figure 1:
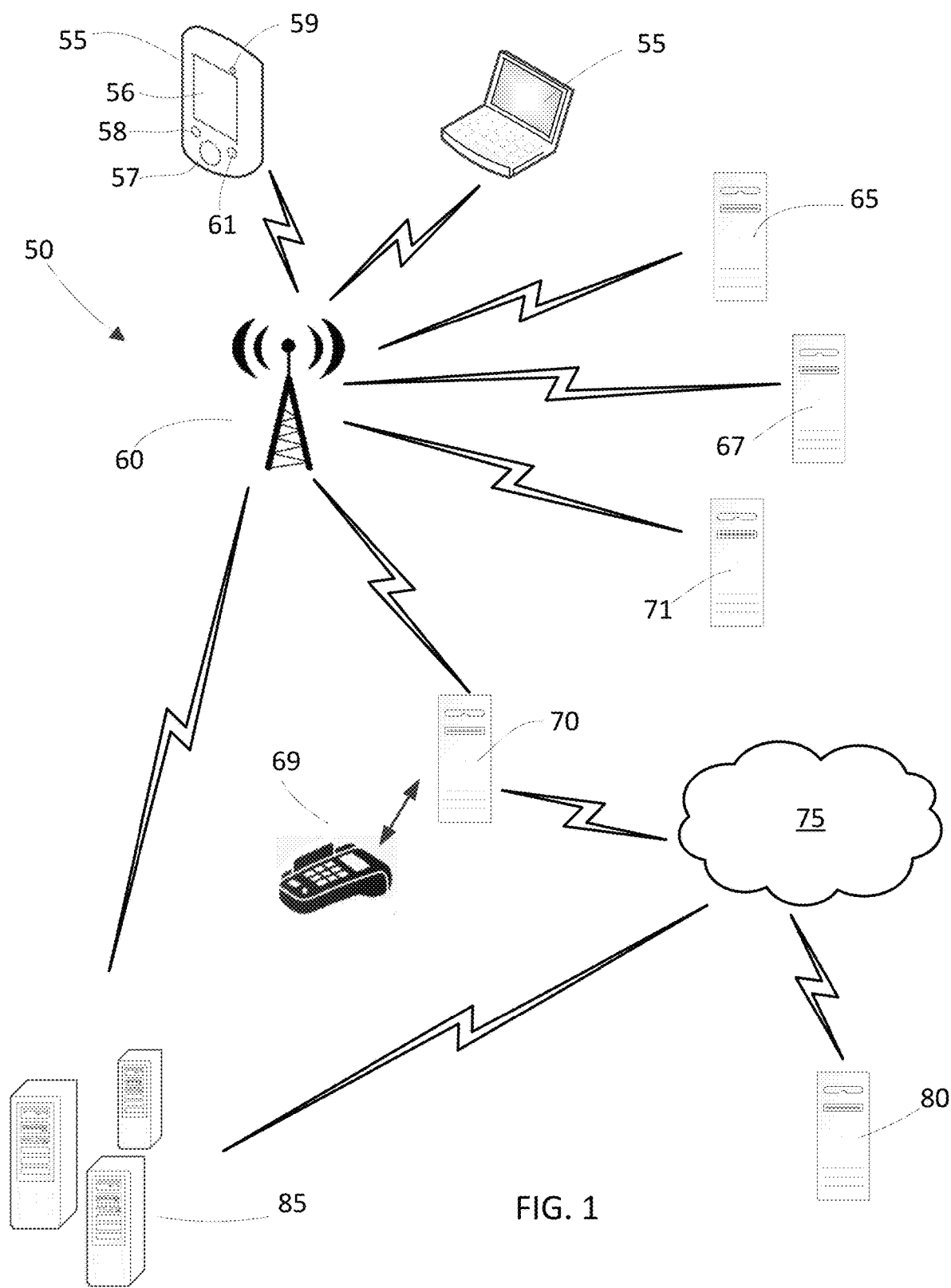
FIG. 1 is an illustration of the elements of an embodiment of a system that includes a system for providing a geographically-based electronic readiness index in accordance with the disclosure.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

The disclosure describes, in some embodiments, a computer-implemented method for extracting data related to various geographically specific dimensions, determining weight dimensions for those dimensions, and generating a general readiness index that may indicate a level of electronic payment readiness for a geographical region. The method may include, in some embodiments, determining a recommended course of action associated with the geographical area.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The adoption of electronic payments in a particular region may depend on various factors specific to that region. Some of these factors may relate to socioeconomic factors, infrastructure factors, factors related to levels of human development (e.g., per the human development index (HDI)), level of investment from the public or private sector, etc. The disclosure describes systems and methods for providing a geographically-based electronic payment readiness index that may, in some embodiments, identify which of these factors may be most relevant to spur the adoption of electronic payments. To do so, the readiness index may include analyzing different variables and indices to classify a geographic region or city according to the level of payment maturity, for example. In some embodiments, the readiness index described herein may include identifying cities or other geographic regions that may have electronic payment acceptance gaps, gaps related to rates of credit card or other payment account issuance, gaps in supporting infrastructure levels, economic conditions, social conditions, etc. The readiness index and the analysis used to provide it may aide in developing strategies and recommendations for increasing electronic payments, for example, at a city or regional level, or at a merchant category level.

Thus, at least one practical application of the system and methods for providing the readiness index described herein may be helping clients and users of a payment processing system that may process electronic payments, such as issuers, acquirers, merchants, etc., increase the adoption of electronic payments. For example, the readiness index may determine that a given geographical area may be well positioned to increase the frequency or volume of electronic payments if more POS devices were available in that area. In some such examples, the data provided with and as a part of the readiness may guide acquirers to determine invest in equipment or other infrastructure, such as point-of-sale (POS) devices. In another example, banks or issuers may use the results of the readiness index to determine bank branch location in geographic areas within which the readiness index may indicate favorable levels of electronic payment acceptance. In another practical example, merchants may use the readiness index to expand their footprint of stores accepting electronic payments in geographical areas where the readiness index may indicate that consumers would use more electronic payments if given increased opportunity. In yet another practical application, local or national governments may use information from the readiness index to focus resources in geographical areas that may most benefit from more investment in infrastructure that would support electronic payments.

In some embodiments, providing the readiness index may include aggregating purchase data from one or more payment processing systems or databases, such as networks and databases associated with processing credit card or other cashless or electronic payment transactions. The aggregated purchase data may be combined with other factors or indicators, such as from public sources. For example, the public sources may be from banking, telecommunications, socioeconomics at a city level or at another geographical level. In some embodiments, the method may include separating the indicators into various dimensions, such as four dimensions, that may impact the volume or frequency of electronic payment use. In some embodiments, the dimensions may be Acceptance, Issuance (i.e., Emission), Infrastructure, and Socioeconomic conditions. In some embodiments, mathematical analyses, such as principal component analysis (PCA), linear regression, or other statistical analytics methodology may be used to determine the particular impacts of each dimension on the electronic payment readiness level. Of course, those skilled in the art may recognize that other mathematical methodology may be used in other embodiments.

A high level illustration of some of the elements in a sample computing system 50 that may be physically configured to implement embodiments of methods for providing a geographically-based electronic payment readiness index is illustrated in FIG. 1. The system 50 may include any number of computing devices 55, such as smart phones or tablet computers, mobile computing devices, wearable mobile devices, desktop computers, laptop computers, or any other computing devices that allow users to interface with a digital communications network, such as digital communication network 60, and to make electronic payments. Connection to the digital communication network 60 may be wired or wireless, and may be via the internet or via a cellular network or any other suitable connection service. Various other computer servers may also be connected to via the digital communication network 60, such as a merchant server 70, a readiness server 85, an infrastructure server 65 that may include an infrastructure database, a socioeconomic server 67 that may include a socioeconomic database, a payment acceptance server 71 that may include a payment acceptance database, and a payment system server 80. The merchant server 70 may also be connected, either directly or over the digital communication network 60, to one or more point-of-sale (POS) devices 69, such as in a merchant store. In some embodiments, the POS devices may be capable of communicating directly with a computing device 55 to conduct electronic payments initiated by a user. Various of the servers or computer entities may also be connected through a secure payment network 75. The payment network 75 may be an electronic payment system used to accept, transmit, or process transactions made by users with payment cards for money, goods, or services, and to transfer information and funds among payment card issuers, merchants, payment card holders, payment processors, acquirers, etc. In the illustrated embodiment, at least the merchant server 70, the payment system server 80, and the readiness server 85 may be connected via the payment network 75, but it is contemplated that other entities, such as the an acquirer or an issuer, may be connected as well. It is also contemplated that the readiness server 85 may also be connected to the one or more user devices 55 over the digital communication network 60.

In one embodiment, the computing device 55 may be a device that operates using a portable power source, such as a battery. The computing device 55 may also have a display 56 which may or may not be a touch sensitive display. More specifically, the display 56 may have a capacitance sensor, for example, that may be used to provide input data to the computing device 55. In other embodiments, an input pad 57 such as arrows, scroll wheels, keyboards, etc., may be used to provide inputs to the computing device 55. In addition, the computing device 55 may have a microphone 58 which may accept and store verbal data, a camera 59 to accept images and a speaker 61 to communicate sounds.

Figure 2:
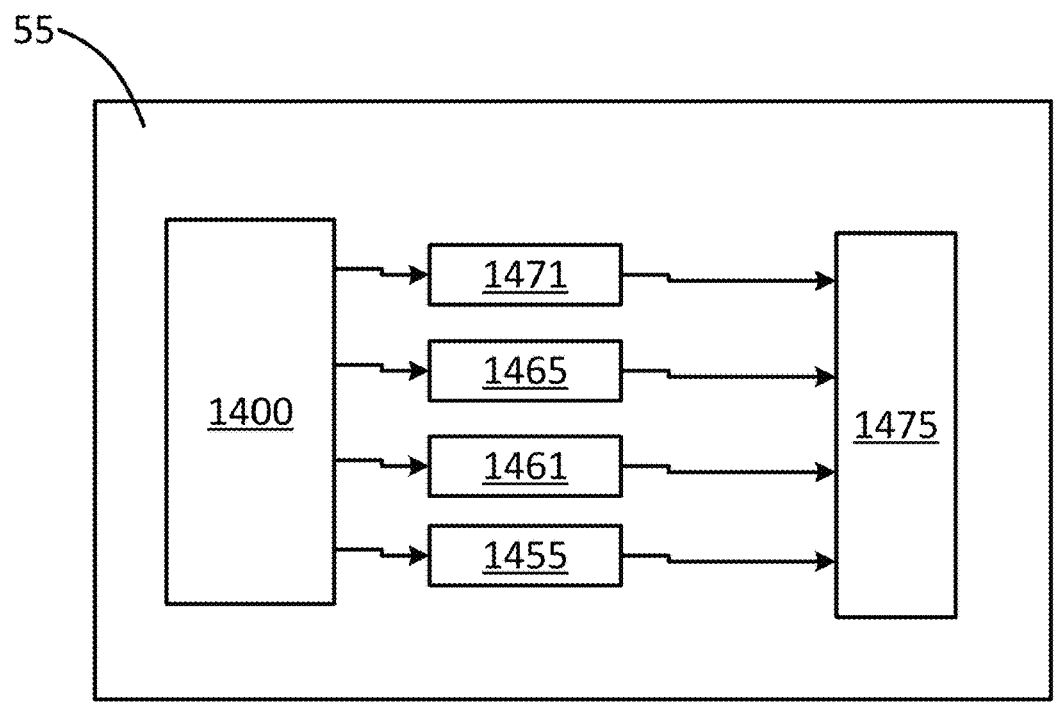
FIG. 2 is a schematic illustration of elements of an embodiment of an example computing device.
Figure 3:
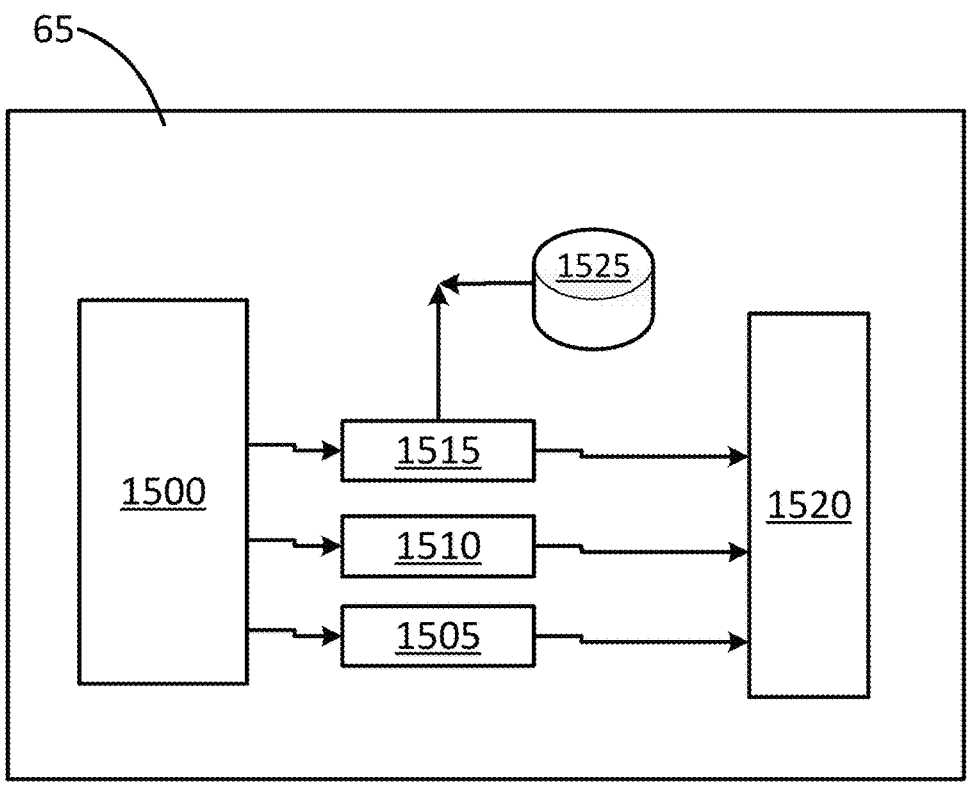
FIG. 3 is a schematic illustration of elements of an embodiment of a server type computing device.

FIG. 2 is a simplified illustration of the physical elements that make up an embodiment of a computing device 55 and FIG. 3 is a simplified illustration of the physical elements that make up an embodiment of a server type computing device, such as the readiness server 85, but the merchant server 70, the readiness server 85, the infrastructure server 65, the socioeconomic server 67, and the payment acceptance server 71 may reflect similar physical elements in some embodiments. Referring to FIG. 2, a sample computing device 55 is illustrated that is physically configured according to be part of the computing system 50 shown in FIG. 1. The portable computing device 55 may have a processor 1451 that is physically configured according to computer executable instructions. In some embodiments, the processor can be specially designed or configured to optimize communication between the server 85 and the computing device 55 relating to the readiness index described herein. The computing device 55 may have a portable power supply 1455 such as a battery, which may be rechargeable. It may also have a sound and video module 1461 which assists in displaying video and sound and may turn off when not in use to conserve power and battery life. The computing device 55 may also have volatile memory 1465 and non-volatile memory 1471. The computing device 55 may have GPS capabilities that may be a separate circuit or may be part of the processor 1451. There also may be an input/output bus 1475 that shuttles data to and from the various user input/output devices such as a microphone, a camera 59, a display 56, or other input/output devices. The portable computing device 55 also may control communicating with the networks, such as communication network 60 in FIG. 1, either through wireless or wired devices. Of course, this is just one embodiment of the portable computing device 55 and the number and types of portable computing devices 55 is limited only by the imagination.

The physical elements that make up an embodiment of a server, such as the readiness server 85, are further illustrated in FIG. 3. In some embodiments, the readiness server is specially configured to provide the readiness index described herein. At a high level, the readiness server 85 may include a digital storage such as a magnetic disk, an optical disk, flash storage, non-volatile storage, etc. Structured data may be stored in the digital storage such as in a database. More specifically, the server 85 may have a processor 1500 that is physically configured according to computer executable instructions. In some embodiments, the processor 1500 can be specially designed or configured to optimize communication between a portable computing device, such as computing device 55, and the server 85 relating to the readiness index as described herein. The server 85 may also have a sound and video module 1505 which assists in displaying video and sound and may turn off when not in use to conserve power and battery life. The server 85 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with the networks, such as communication network 60 and payment network 75, either through wireless or wired devices. In some embodiments, a readiness index controller configured to implement methods related to the readiness index described herein may be located on readiness server 85, or both the computing device 55 and the server 85. Of course, this is just one embodiment of the readiness server 85 and additional types of servers are contemplated herein.

Figure 4:
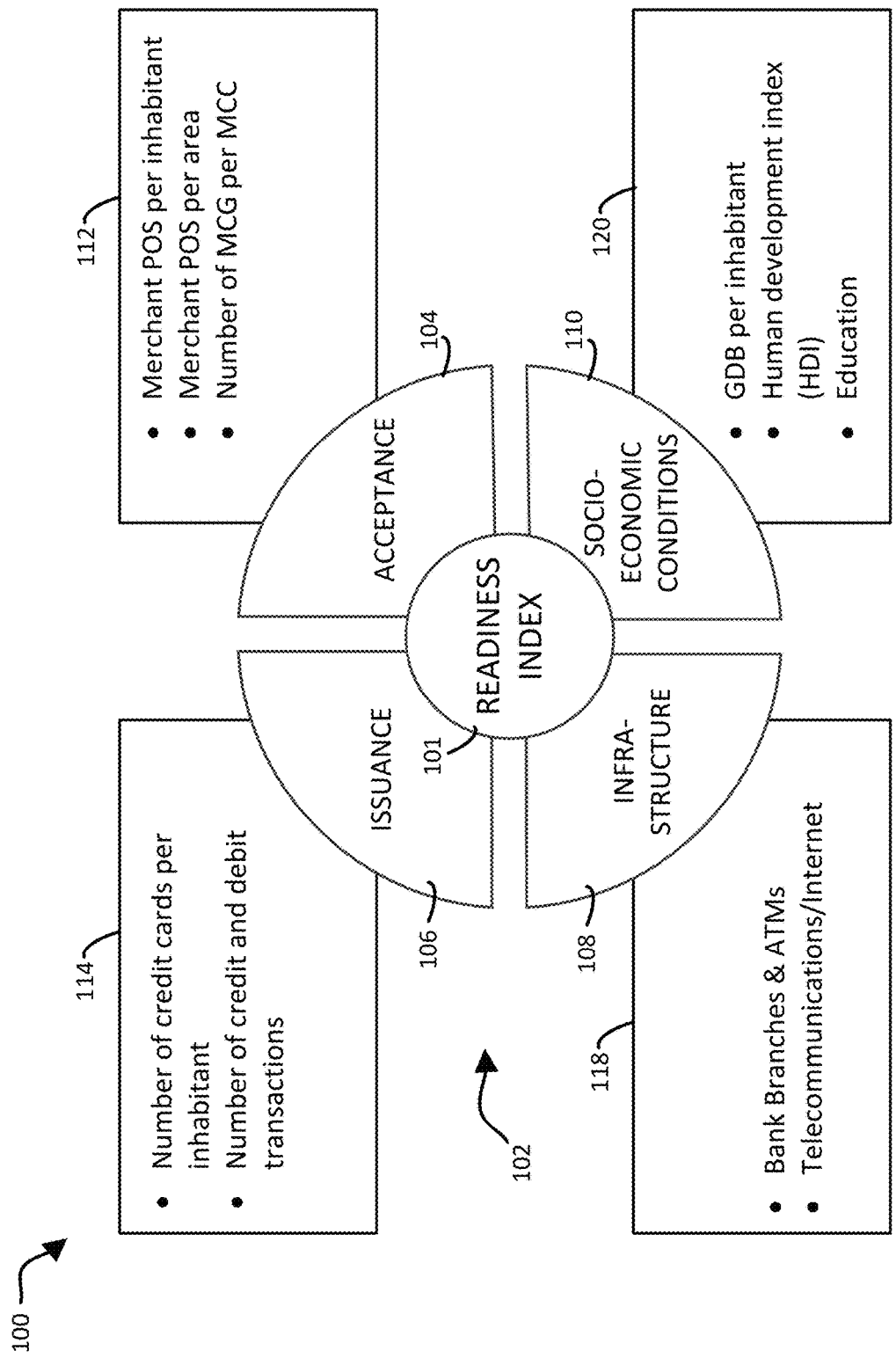
FIG. 4 is a diagram illustrating dimensions that may make up an embodiment of the geographically-based electronic payment readiness index.
Figure 8A:
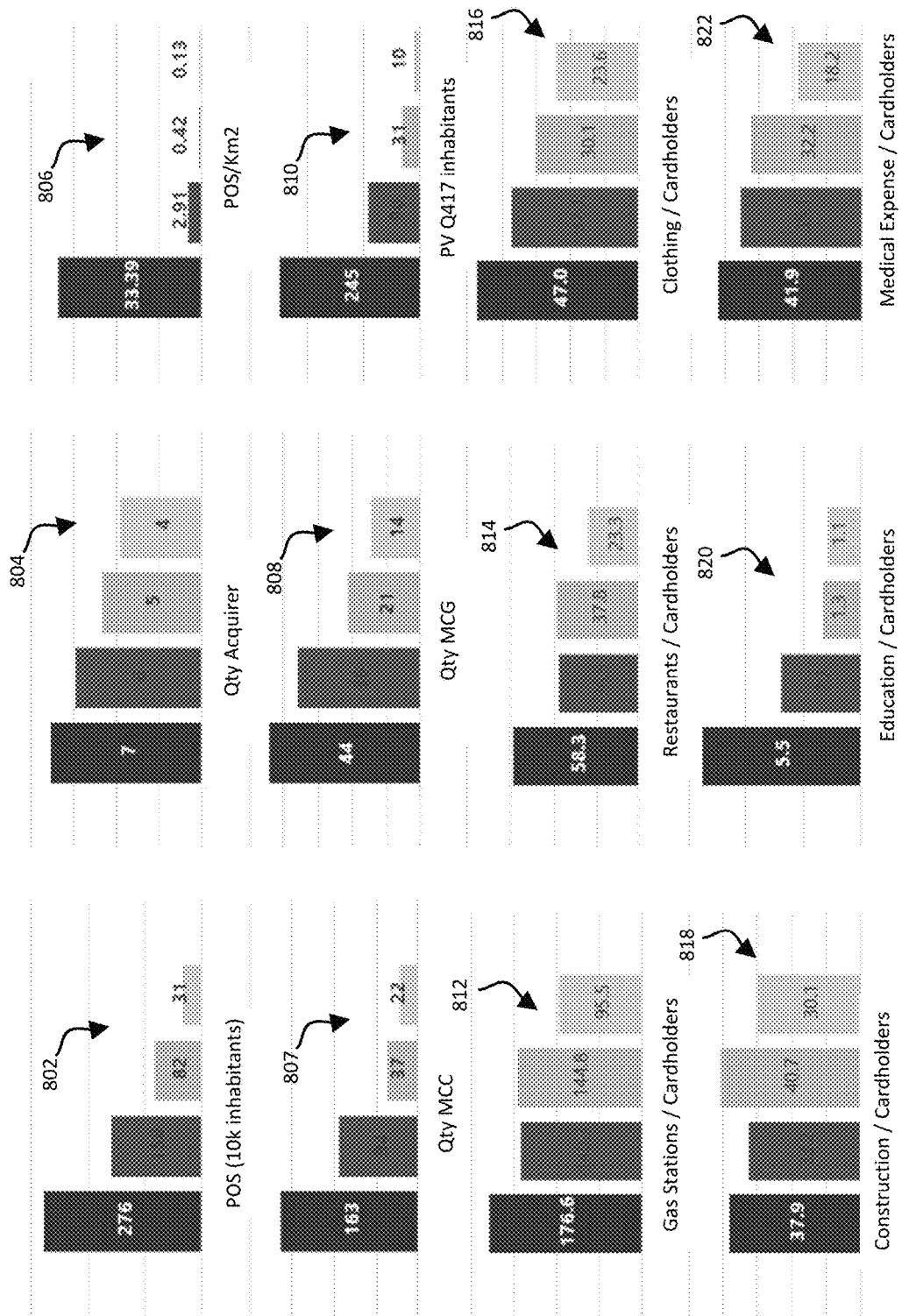
FIG. 8A is a plurality of bar graphs illustrating representations of certain factors making up an acceptance dimension of the geographically-based electronic payment readiness index.

FIG. 4 is a diagram 100 illustrating four dimensions 102 of the one or more dimensions of information that may make up the readiness index 101. While FIG. 4 illustrates four dimensions making up the readiness index 101, other embodiments of the readiness index may include more or fewer than four dimensions. In some embodiments, the readiness index 101 may include an acceptance dimension 104, an issuance dimension 106, an infrastructure dimension 108, and a socioeconomic dimension 110. The acceptance dimension 104 of the readiness index 101 may be made up of various acceptance factors 112, such as merchant POS device per inhabitant in the particular geographic region or city, merchant POS device per land area, such as square mile or square kilometer, and merchant category group (MCG) per merchant category code (MCC). Graphical representations of the compositions of the acceptance dimension are shown in FIG. 8A. The bar graphs in FIG. 8A show representations of certain factors broken into various levels of readiness for adopting electronic payments as indicated by the key 801. From left to right in each bar graph, the particular value for each factor is displayed for regions/cities that have been categorized with respect to electronic payment readiness as: materially ready, in transition, emerging, and incipient. In some embodiments, the acceptance dimension may include POS per 10 k inhabitants 802, quantity of acquirers 804, POS/km$^2$ 806, quantity of merchant category codes (MCC) 807, quantity of merchant category groups (MCG) 808, PV in Q4 of 2017 inhabitants 810, gas stations per cardholder 812, restaurants per cardholder 814, clothing stores per cardholder 816, construction per cardholder 818, education level per cardholder 820, and medical expenses per cardholder 822. Those skilled in the art will recognize that these are merely examples of factors that may be included in the acceptance dimension, and that other additional factors may be included as well. MCG may indicate the primary type of trade conducted by a merchant, such as healthcare, durable goods, gambling, etc. MCC may be used to classify a business by the type of goods or services it provides. MCCs may be assigned by merchant type (e.g. one for hotels, one for office supply stores, etc.) or by merchant name. In some embodiments, the acceptance factors 112 may be stored in an payment acceptance database stored on the payment system server 80.

Figure 8B:
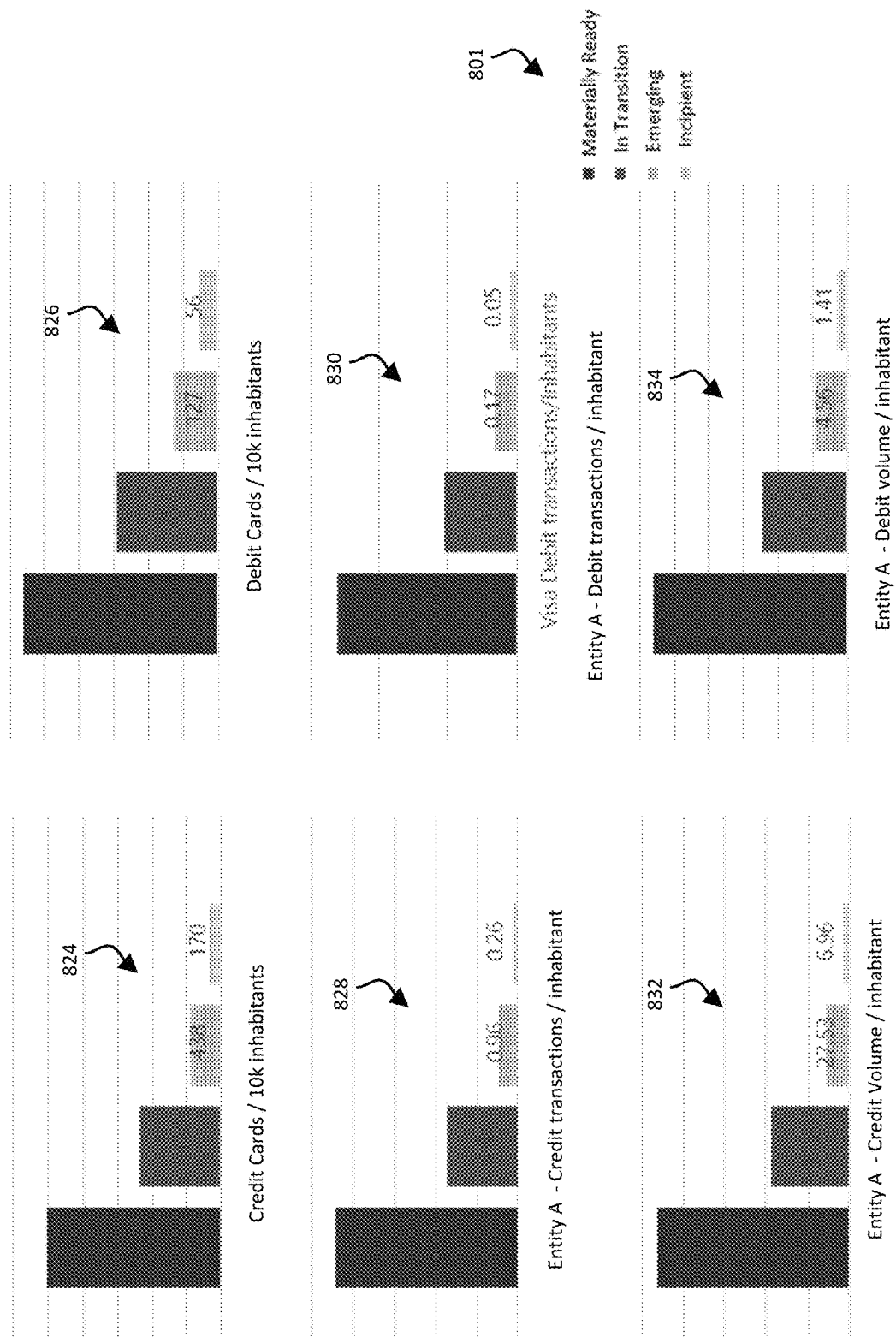
FIG. 8B is a plurality of bar graphs illustrating representations of certain factors making up an issuance dimension of the geographically-based electronic payment readiness index.

The issuance dimension 106 of the readiness index 101 may be made up of various issuance factors 114 such as number of credit cards per inhabitant in a particular geographical region, number of debit and credit transactions in a particular geographical region, etc. Graphical representations of the compositions of the issuance dimension are shown in FIG. 8B. The bar graphs in FIG. 8B show representations of certain factors broken into various levels of readiness for adopting electronic payments as indicated by the key 801. In some embodiments, the issuance dimension 106 may include credit cards per 10 k inhabitants 824, debit cards per 10 k inhabitants 826, credit transactions per inhabitant for a payment system entity 828, such as a credit card company or payment system operator (Entity A), debit transactions per inhabitant 830 by the payment system entity, credit volume per inhabitant by the payment system entity 832, and debit volume per inhabitant 834 for the payment system entity. Those skilled in the art will recognize that these are merely examples of factors that may be included in the issuance dimension, and that other additional factors may be included as well. In some embodiments, the issuance factors 114 may be stored in an issuance database stored on the payment system server 80.

Figure 8C:
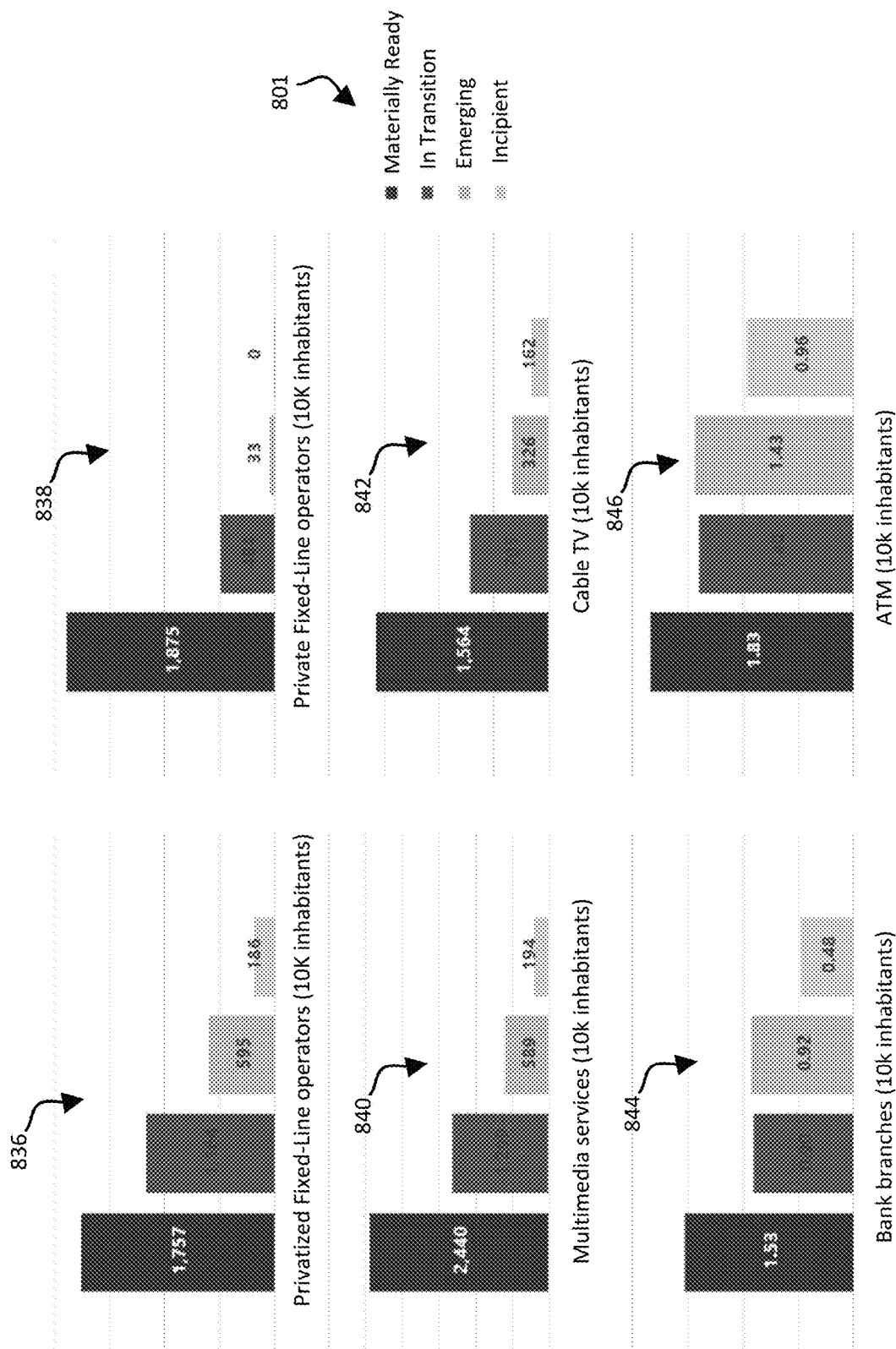
FIG. 8C is a plurality of bar graphs illustrating representations of certain factors making up an infrastructure dimension of the geographically-based electronic payment readiness index.

The infrastructure dimension 108 of the readiness index 101 may be made up of various infrastructure factors 116 such as number or quality of bank branches and automated teller machines (ATMs), the status, quality, and level of the telecommunications system and internet service, etc. Graphical representations of the compositions of the infrastructure dimension are shown in FIG. 8C. The bar graphs in FIG. 8C show representations of certain factors broken into 801. The infrastructure dimension 108 may include privatized fixed-line operators per 10 k inhabitant 836, private fixed-line operators per 10 k inhabitants 838, multimedia services per 10 k inhabitants 840, cable TV per 10 k inhabitants 842, bank branches per 10 k inhabitants 844, and ATMs per 10 k inhabitants 846. Those skilled in the art will recognize that these are merely examples of factors that may be included in the infrastructure dimension, and that other additional factors may be included as well. In some embodiments, the infrastructure factors 116 may be stored in an infrastructure database stored on the infrastructure server 65. The infrastructure server 65 may be one or more servers with publicly available infrastructure information or data, such as a central bank server, telecommunications agencies, government agencies, or other data gathering entities.

Figure 8D:
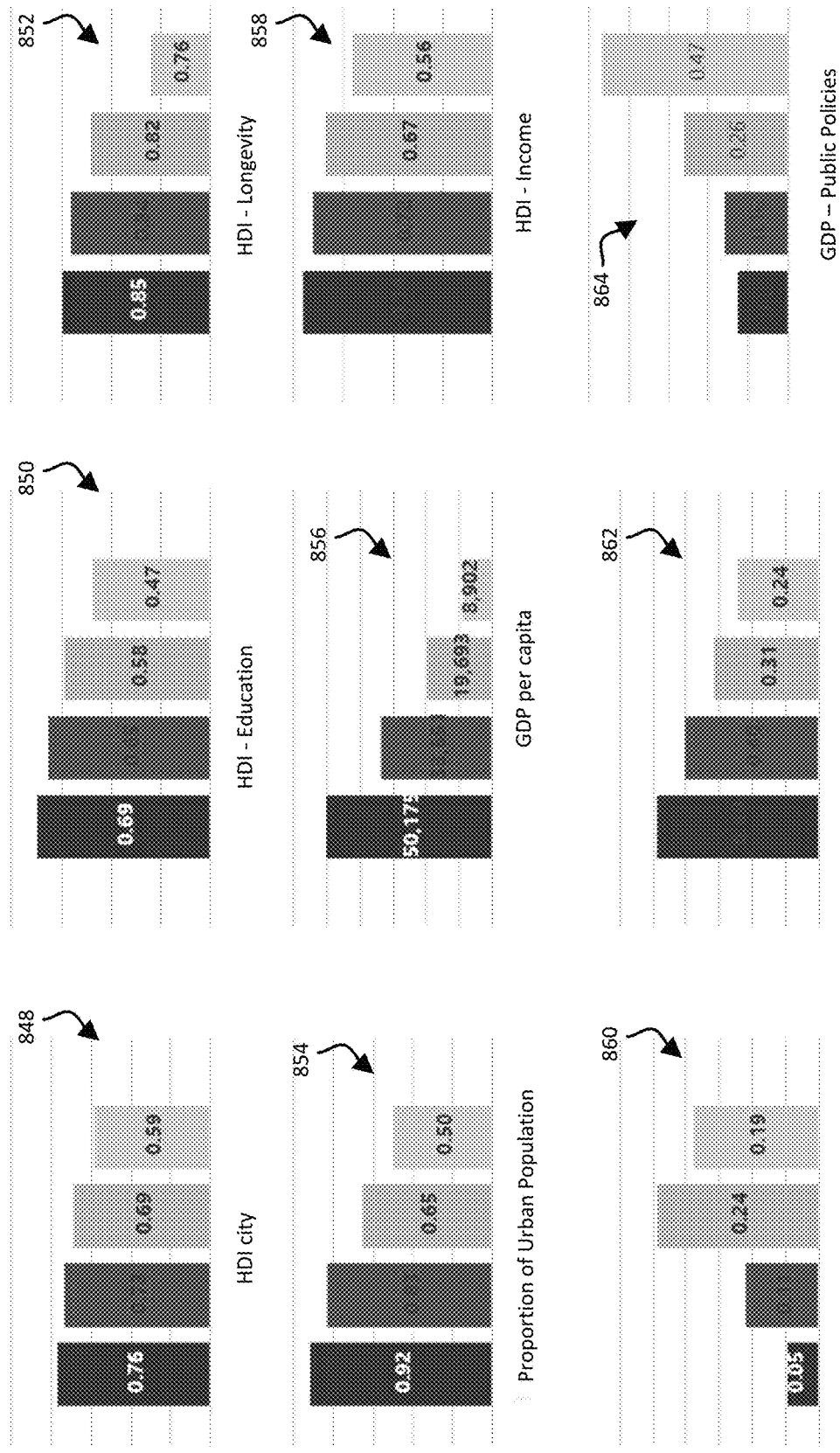
FIG. 8D is a plurality of bar graphs illustrating representations of certain factors making up a socioeconomic dimension of the geographically-based electronic payment readiness index.

The socioeconomic dimension 110 of the readiness index 101 may be made up of various socioeconomic factors 118 including GDP per inhabitant, human development index, and education levels of the particular geographic region. In some embodiments, the socioeconomic factors 118 may be stored in a socioeconomic database stored on the socioeconomic server 67. Graphical representations of the compositions of the socioeconomic dimension are shown in FIG. 8D. The bar graphs in FIG. 8D show representations of certain factors broken into various levels of readiness for adopting electronic payments as indicated by the key 801. The socioeconomic dimension 110 may include the human development index (HDI) for the city or geographic region 848, the HDI related education 850, HDI related to longevity 852, the proportion of urban population 854, the GDP per capita 856, the HDI related to income 858, the farming proportion of GDP 860, the service sector proportion of GDP, and the public policy proportion of GDP. Those skilled in the art will recognize that these are merely examples of factors that may be included in the socioeconomic dimension, and that other additional factors may be included as well. In some embodiments, the socioeconomic server 67 may be one or more servers related to one or more entities or government agencies. It should be understood that, although the acceptance database, issuance database, infrastructure database, and socioeconomic database are described as being stored on respective payment system, infrastructure, and socioeconomic servers, in some embodiments all databases may be housed on a single server or on multiple servers.

Figure 5:
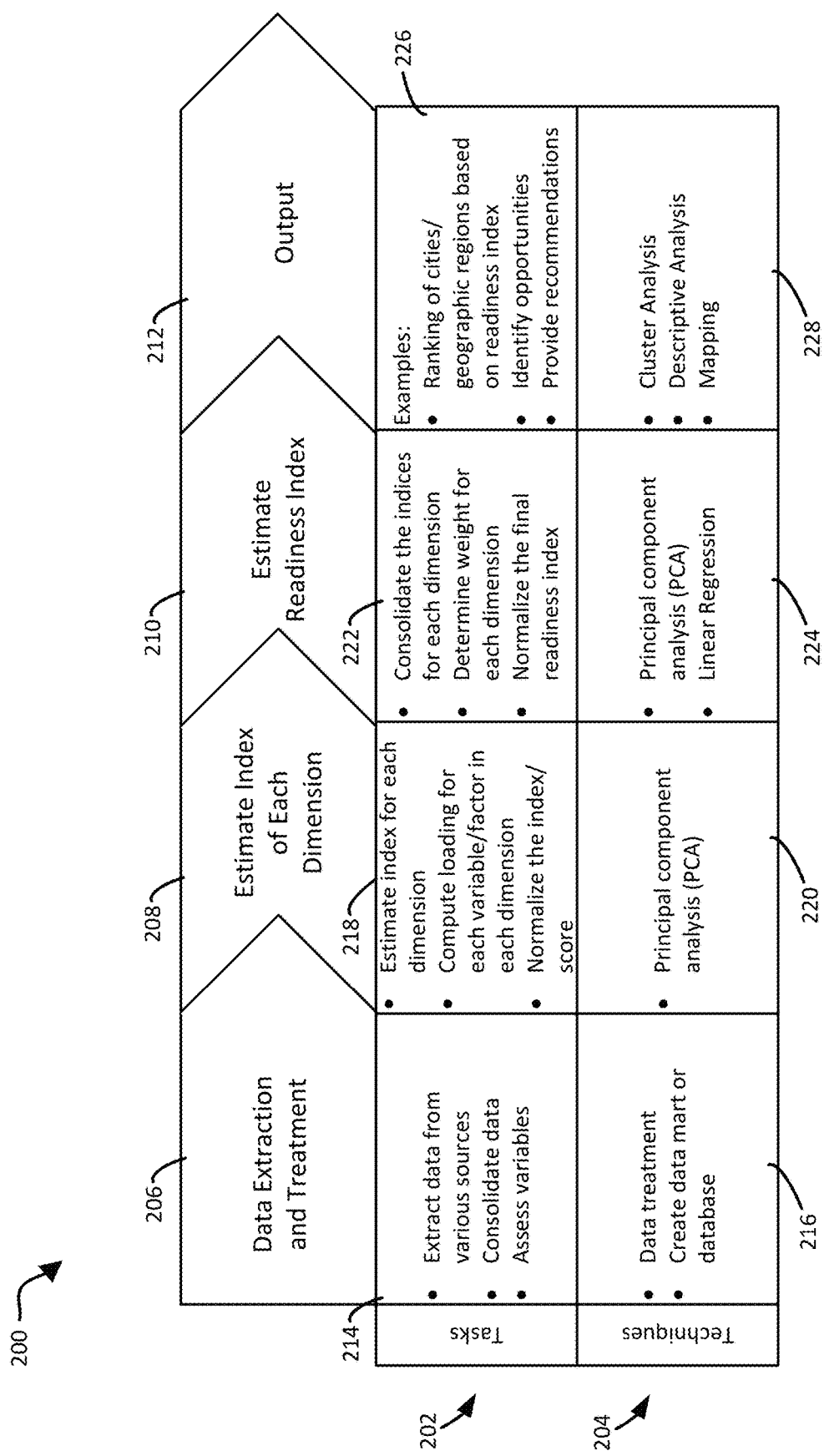
FIG. 5 is a flow diagram of an embodiment of a methodology for providing the geographically-based electronic payment readiness index.

FIG. 5 is a diagram 200 illustrating an embodiment of a methodology for providing a geographically-based electronic payment readiness index. The diagram 200 includes a grid with several steps including data extraction and treatment 206, estimating an index of each dimension 208, estimating a readiness index 210, and providing an output 212. It should be contemplated that other embodiments may include fewer or more steps, or execute these steps in differing orders to the extent suitable for carrying out the described processes. The diagram 200 includes one or more tasks 202 performed at each step, and includes example techniques 204 for accomplishing those tasks. It should be understood, however, that each step may include more or fewer tasks that may be accomplished using techniques not described herein but still within the scope of the disclosure.

During data extraction and treatment 206, the system (e.g., the readiness server 85) may, at 214, extract data from various sources, such as the payment system server 80, the socioeconomic server 67, the infrastructure server 65, or any other source containing information relevant to the readiness index analysis or its dimensions. The data extraction and treatment step 206 may additionally include consolidating the extracted data, and assessing variables present in the data. In some embodiments, some techniques used for data extraction and treatment 206 may be, at 216, data treatment to put the extracted data in a suitable form for further use, and/or creating a data mart or separate database for the extracted data. Those skilled in the art will appreciate that other suitable techniques may be used.

Estimating the index of each dimension 208 may include, at 218, estimating a dimension index for each dimension, computing or otherwise determining a loading for each variable/factor in each dimension, and normalizing the dimension index. For example, the issuance dimension 106 shown in FIG. 4 may be made up of various factors that may be measured in various different ways with differing units. In some embodiments, the method described herein may include assessing each issuance factor 114 to determine a weight or loading to be attributed to each factor. Based on the loading of the factors, the readiness server 85 may normalize the issuance factors into a unit free index, i.e., the issuance dimension based on a predetermined criteria for assessing the issuance factors (e.g., issuance factors 114). In some embodiments, a similar process may occur for each dimension and its respective factors, such as the acceptance dimension 104, the infrastructure dimension 108, and the socioeconomic dimension 110. In some embodiments, each dimension will then have a normalized dimension index that may indicate the presence of each of the factors in each respective dimension. In the embodiment in FIG. 4 with four dimensions, the normalization process may result in an acceptance dimension index, an issuance dimension index, an infrastructure dimension index, and a socioeconomic dimension index. In some embodiments, each dimension index may have a value between 0 and 1.0, or between 0 and 100, etc. In one merely illustrative example, the factors for each dimension in a particular geographic region may result in an acceptance dimension index of 0.8, an issuance dimension index of 0.6, an infrastructure dimension index of 0.7, and a socioeconomic dimension index of 0.5. In some embodiments, estimating the index of each dimension 208 may be completed using, at 220, principal component analysis (PCA), but other suitable techniques may be used as well.

Figure 7:
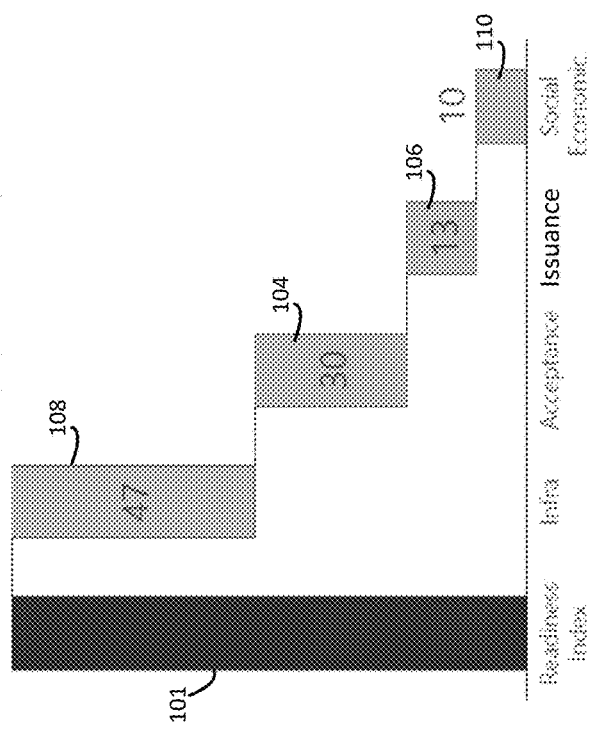
FIG. 7 is a graphical representation of an embodiment of geographically-based electronic payment readiness index by proportion of each dimension.

Estimating the readiness index 210 may include, at 222, consolidating the indices determined for each dimension, determining a dimension weight for each dimension, and normalizing the final readiness index based on the dimension weights. In some embodiments, determining a dimension weight for each dimension may be based on various factors particular to the geographical region or upon analysis of other geographical regions to determine which dimensions and factors within those dimensions are most indicative of electronic payment readiness. For example, in some embodiments, statistical analysis of other geographical regions and their relative levels of electronic payment implementation in view of the one or more dimensions as applied to each of those regions may provide a basis for assigning a dimension weight to each of the dimensions that make up the readiness index. In some embodiments, the weighting of each dimension may add up to 1.0 (or 100, depending on the scale). For example, in one merely illustrative embodiment, analysis of other geographical regions may indicate that the infrastructure dimension is more important than other dimensions in determining a level of electronic payment readiness, that the acceptance dimension is next most important, followed by the issuance dimension and then the socioeconomic dimension. In such an embodiment, the analysis may apply a dimension weight of 0.47 for the infrastructure dimension, a weight of 0.3 for the acceptance dimension, a weight of 0.13 for the issuance dimension, and a weight of 0.10 for the socioeconomic dimension (i.e., the sum of the weights adding up to 1.0). A graphical representation of such an embodiment is shown in FIG. 7, indicating the proportion that each dimension contributes to explaining the overall readiness index. In some embodiments, the process of assigning weights to each dimension may vary depending on the particular geographic region of interest. For example, in some embodiments, the weighting of the various dimensions may be based on analysis performed on geographic regions similar to the particular geographic region of interest in a given analysis, such as similar populations, similar nearby geographic regions, same or similar country, etc. Those skilled in the art will understand that other factors may be used to determine the best comparison of geographic regions for the purposes of assigning dimension weighting.

In some embodiments, normalizing the final readiness index, at 222, may include generating a weighted dimension index for each dimension in the readiness index. In some embodiments, generating the weighted dimension index for each dimension may include multiplying the normalized index for each dimension by the dimension weighting assigned to each respective dimension. In the illustrative example above, the dimension weights, the normalized indices for each dimension, and the resulting weighted dimension indices for each dimension are as follows in Table 1:

TABLE 1

|  | Infrastructure Dimension | Issuance Dimension | Acceptance Dimension | Socioeconomic Dimension |
| --- | --- | --- | --- | --- |
| Dimension Index | 0.7 | 0.6 | 0.8 | 0.5 |
| Dimension Weight | 0.47 | 0.13 | 0.30 | 0.10 |
| Weighted Dimension Index | 0.329 | 0.078 | 0.24 | 0.05 |

The normalized readiness index may then be determined by adding together the sum of all the weighted dimension indices. Thus, in the illustrative example the readiness index may be 0.697 (i.e., 0.329+0.078+0.24+0.05=0.697). In such embodiments, the readiness index may have a value somewhere between 0 and 1.0; however, other scales may be similarly suitable for the readiness index, such as 0 through 100. In some embodiments, the readiness index may be expressed as a percentage, such as between 0% and 100%. In some embodiments, estimating the readiness index may, at 224, be performed using principal component analysis (PCA) of the four dimension indices or weighted dimension indices, linear regression, or other mathematical or statistical techniques known to those of skill in the art.

The analysis described and shown in the diagram 200 may be performed in any number of cities or other geographic regions. Outputs 212 to such analysis, at 226, may include ranking of those regions by their readiness for electronic payment based on their respective electronic readiness index. At 228, these and other outputs 212 may be performed using cluster analysis, descriptive analysis, mapping, etc. In some embodiments, a relatively high readiness index value may reflect that a particular geographic region is relatively well prepared for adopting electronic payment methods, while a relatively low readiness index value may reflect that a particular region may not be prepared to adopt electronic payment methods. Such a ranking of geographic regions based on their readiness index may help entities, such as payment system services, local governments, merchants, acquirers, issuers, etc., identify opportunities for future investment of resources.

Accordingly, the method provides a technical solution to at least the technical problem of entities analyzing available data to determine where to best allocate resources for efficient future expansion. The readiness server, using the methods described herein, may output recommendations for entities based on the readiness index. For example, an acquirer may use the readiness index results to determine which regions would increase volume of electronic payments if more POS devices were available in that region. In some embodiments, an issuer may plan efforts for new rollouts of electronic payment products in certain regions if, for example, the readiness index is high but perhaps only the issuance dimension index is relatively low. Similarly, a merchant may expand its footprint into certain regions where the readiness index may be relatively high, but the acceptance dimension index may be relatively low; thus, increasing acceptance opportunities in the region may increase electronic payment volume.

Figure 6:
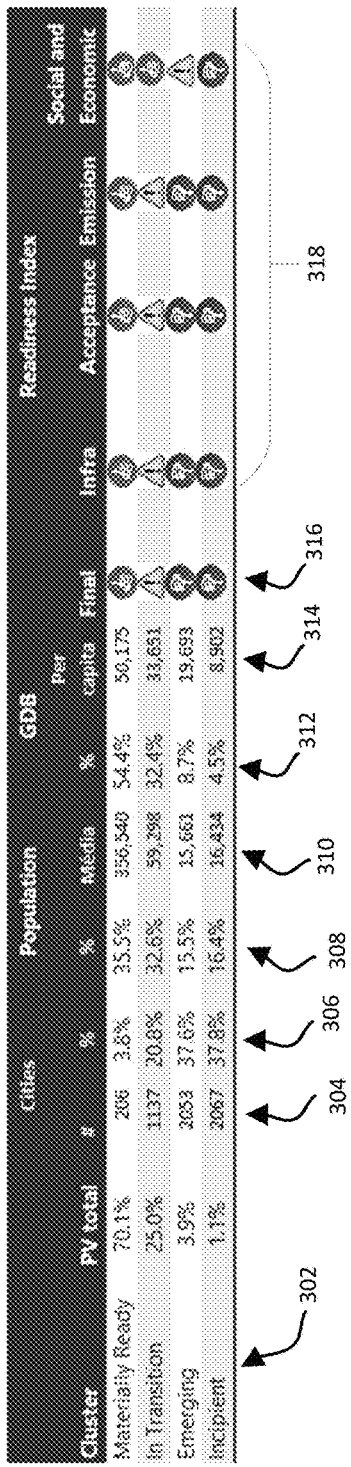
FIG. 6 is an exemplary graphical user interface (GUI) that may be used in an embodiment of the geographically-based electronic payment readiness index.

FIG. 6 is an exemplary graphical user interface (GUI) 300 that may be used in an embodiment of the readiness index. In some embodiments, cities with similar profiles may be grouped into substantially homogenous clusters 302. In some embodiments, the clusters may include a Materially Ready cluster, an In Transition cluster, an Emerging cluster, and an Incipient cluster. It should be understood, however, that different categories of similarly situated geographic regions may be used in other embodiments. The GUI 300 may include the number of cities or geographic regions 304 in a particular cluster, the percentage of cities in that cluster as compared to all the cities analyzed 306, the percentage of the population residing in the cities in each cluster 308, and the average number of people in each of the cities or regions in a cluster 310. The GUI might also include the percentage 312 of the total gross national product (GDP) of a particular country that relates to each cluster, and the per capita GDP 314 of each cluster. The GUI may also include graphical indicators 318 for each dimension of the readiness index and graphical indicators 316 for the final readiness index itself per cluster. In some embodiments, the graphical indicators may represent the relative values of the indices of each dimension, and the relative value of the readiness index itself for each of the clusters. In some embodiments, numerical values may be used in the GUI 300 to represent the relative values of the dimension indices and the readiness index or range of index values for each cluster.

In some embodiments, the GUI may also include a graphical electronic payment readiness visualization based on a plurality of general readiness indices for a plurality of cities or geographic regions. The visualization may include a graphical representation of a map of the cities or geographical regions in question. In some embodiments, the regions in question may be included within the same country. The visualization may reflect a general readiness index value for each respective geographical area. In some embodiments, the visualization may be a readiness map including each of the plurality of geographical areas. In some embodiments, each of the geographical areas on the readiness map may be colored based on the general readiness index value for each of the respective plurality of cities or geographical areas. In some embodiments, the color of each geographical region in the visualization may reflect a recommended course of action associated with the respective geographical region. In some embodiments, the electronic payment readiness visualization may reflect a percentage of the plurality of geographical areas with a general readiness index value above a predetermined threshold value.

Figure 9:
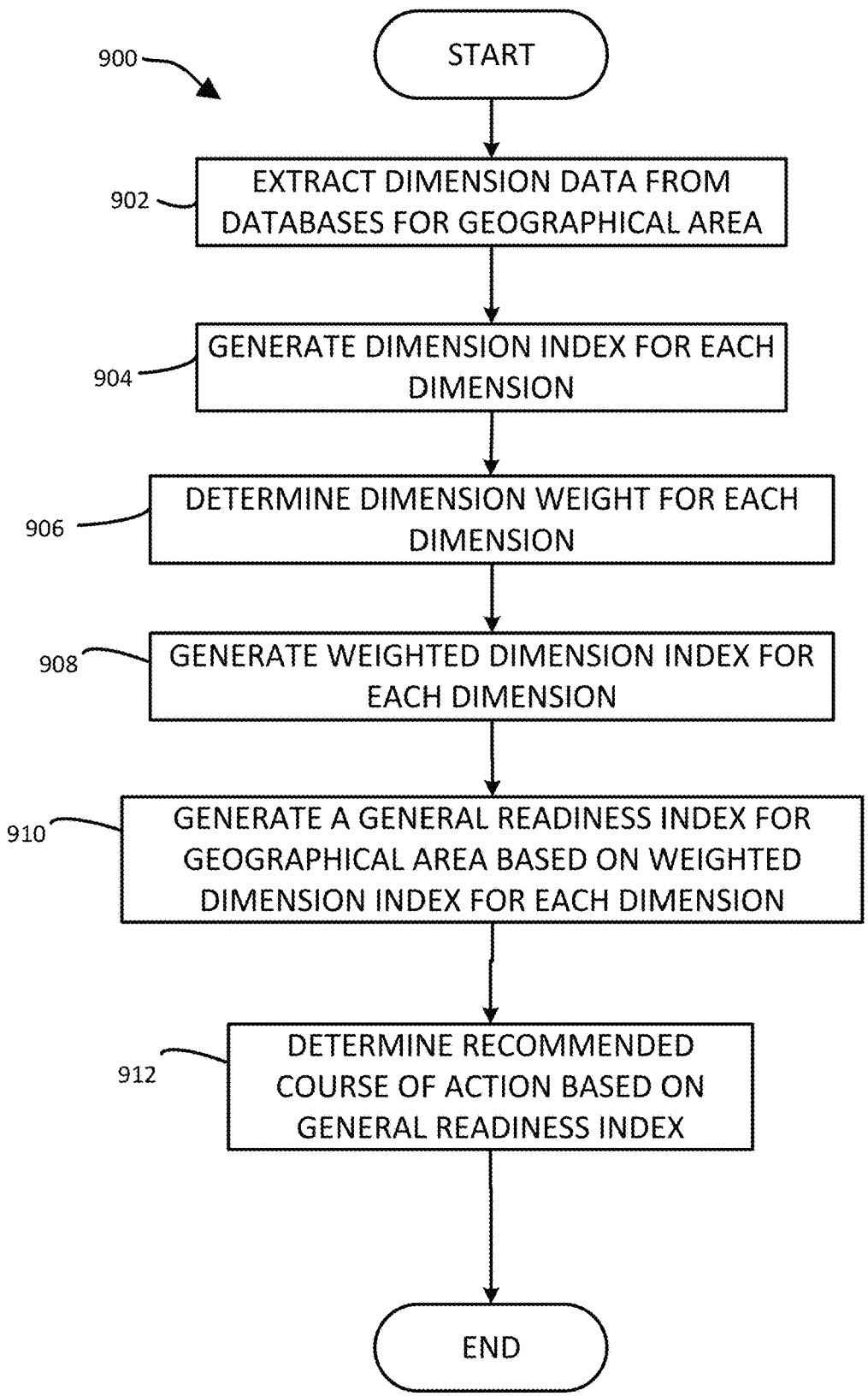
FIG. 9 is a flow chart an embodiment of a process for providing the geographically-based electronic readiness index.

FIG. 9 is a flow chart 900 of an embodiment of a method of providing a geographically-based electronic payment readiness index. In some embodiments, the method may be executed by a readiness server, such as readiness server 85. The method may include, at 902, extracting data from one or more databases related to at least one of a plurality of dimensions for a geographical area, such as a city. In some embodiments, the plurality of dimensions may include an acceptance dimension, an issuance dimension, an infrastructure dimension, and a socioeconomic dimension. At 904, based on the extracted for each of the dimensions, the method may include generating a dimension index for each dimension. In some embodiments, the acceptance dimension may have a corresponding acceptance index, the issuance dimension may include a corresponding issuance index, the infrastructure dimension may include a corresponding infrastructure index, and the socioeconomic dimension may include a socioeconomic index. In some embodiments, each index may be a value between 0 and 1 or between 0 and 100. At 906, the method may include determining a dimension weight for each dimension. In some embodiments, all of the dimension weights for the dimensions may add up to 1.0 or to 100%. At 908, the method may include generating a weighted dimension index for each of the dimensions. In some embodiments, the weighted dimension index may be determined by multiplying each dimension index by its respective dimension weight. At 910, the method may include generating a general readiness index for the particular geographical area based on the sum of the weighted dimension index for each of the plurality of dimensions. In some embodiments, a relatively high value of the general readiness index may indicate that the geographical region or city in question may be poised to adopt more electronic payments. At 912, the method may include providing a recommended course of action based on the general readiness index. The recommended course of action may include installing additional POS devices, increasing a merchant footprint in a region, or providing additional credit cards or credit accounts.

Thus, using the method described herein may be measure how prepared a city or other geographic region may be to adopt electronic payment methods. Once the readiness index for various cities or regions has been completed, cities with similar indices may be grouped into homogenous clusters, where cities allocated to different clusters may present dissonant consumption profiles. In some embodiments, the infrastructure dimension may be determined to be the most relevant factor for a city or geographic region to adopt electronic payments. Additionally, in some embodiments, it may be determined that increasing card or payment account acceptance (i.e., acceptance dimension) may be more important than increasing issued cards (i.e., issuance dimension). Based on the readiness index, entities may develop a strategic plan for each cluster of cities and enable the entities to focus on the most relevant regions (i.e., highest readiness index). As a result, the electronic payment system for a particular region may be developed to encourage migration from cash payments to electronic payments.

Any of the software components or functions described in this application, may be implemented as software code or computer readable instructions that may be executed by at least one processor using any suitable computer language such as, for example, Java, C++ or Perl using, for example, conventional or object-oriented techniques. In some examples, the at least one processor may be specifically programmed.

The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed (or physically configured) to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, system 50 and the methods described herein may be configured to provide an electronic payment readiness index that may help entities more accurately and efficiently deploy resources to most effectively grow engagement with a payment system. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method for providing a geographically-based electronic payment readiness index, the method comprising:
   extracting data from one or more databases, the data including factors related to at least one of a plurality of dimensions for a geographical area;
   normalizing the factors for each of the plurality of dimensions into a unit-free format;
   based on the normalized factors for each of the plurality of dimensions, generating, via one or more processors, a dimension index for each of the plurality of dimensions;
   determining, via the one or more processors, a dimension weight for each dimension of the plurality of dimensions;
   generating, via the one or more processors, a weighted dimension index for each of the plurality of dimensions by combining the dimension index for each of the plurality of dimensions with the dimension weight for each respective one of the plurality of dimensions;
   generating, via the one or more processors, a general readiness index for the geographical area based on the weighted dimension index for each of the plurality of dimensions, the general readiness index indicating a level of electronic payment readiness for the geographical area;
   determining, via the one or more processors, whether the general readiness index for the geographical area exceeds a predetermined threshold index value;
   providing, via the one or more processors a graphical user interface (GUI) including an electronic payment readiness map; and
   displaying the geographical area in a first color when the general readiness index exceeds the predetermined threshold index value and displaying the geographical area in a second color when the general readiness index does not exceed the predetermined threshold index value.

2. The method of claim 1, wherein at least one of the plurality of dimensions includes data for a number of credit cards per inhabitant in the geographical area.

3. The method of claim 1, wherein at least one of the plurality of dimensions includes data for a number of point-of-sale (POS) devices in the geographical area.

4. The method of claim 1, wherein at least one of the plurality of dimensions includes data related to socioeconomic conditions in the geographical area.

5. The method of claim 1, wherein at least one of the plurality of dimensions includes data related to a number of bank branches in the geographical area.

6. The method of claim 1, wherein the dimension index for each of the plurality of dimensions is generated using principal component analysis (PCA).

7. The method of claim 1, wherein the general readiness index is generated using principal component analysis (PCA).

8. The method of claim 1 further comprising providing a recommended course of action for the geographical area that includes installing additional electronic payment point-of-sale devices in the geographical area when the general readiness index exceeds the predetermined threshold index value.

9. The method of claim 1, wherein the general readiness index is a number greater than or equal to zero and less than or equal to one.

10. A computer-implemented method for providing a geographically-based electronic payment readiness index, the method comprising:
    extracting issuance data from an issuance database, the issuance data being associated with a geographical area;
    extracting infrastructure data from an infrastructure database, the infrastructure data being associated with the geographical area;
    extracting socioeconomic data from a socioeconomic database, the socioeconomic data being associated with the geographical area;
    extracting payment acceptance data from a payment acceptance database, the payment acceptance data being associated with the geographical area;
    normalizing each of the issuance data, the infrastructure data, the socioeconomic data, and the payment acceptance data in to a unit-free format;
    determining, via one or more processors, an issuance index for the geographical area based on the normalized issuance data, an infrastructure index for the geographical area based on the normalized infrastructure data, a socioeconomic index for the geographical area based on the normalized socioeconomic data, and a payment acceptance index for the geographical area based on the normalized payment acceptance data;
    determining, via the one or more processors, a comparative weight for each of the issuance index, the infrastructure index, the socioeconomic index, and the payment acceptance index;
    generating, via the one or more processors, a weighted issuance index, a weighted infrastructure index, a weighted socioeconomic index, and a weighted payment acceptance index based on the comparative weight for each respective index;
    generating, via the one or more processors, a general readiness index for the geographical area, the general readiness index being based at least on the weighted issuance index, the weighted infrastructure index, the weighted socioeconomic index, and the weighted payment acceptance index, wherein the general readiness index indicates a level of electronic payment readiness for the geographical area;
    determining, via the one or more processors, whether the general readiness index for the geographical area exceeds a predetermined threshold index value;
    providing, via the one or more processors, a graphical user interface (GUI) including an electronic payment readiness map; and
    displaying the geographical area in a first color when the general readiness index exceeds the predetermined threshold index value and displaying the geographical area in a second color when the general readiness index does not exceed the predetermined threshold index value.

11. The method of claim 10, wherein the issuance index, the infrastructure index, the payment acceptance index, and the socioeconomic index are each generated using principal component analysis (PCA).

12. The method of claim 10, wherein general readiness index is generated using principal component analysis (PCA).

13. The method of claim 10 further comprising providing a recommended course of action for the geographical area that includes installing additional electronic payment point-of-sale devices in the geographical area.

14. A computer-implemented method for providing a geographically-based electronic payment readiness index, the method comprising:
- extracting data from one or more databases, the data including factors related to at least one of a plurality of dimensions for each of a plurality of a geographical areas;
- normalizing the factors for each of the plurality of dimensions into a unit-free format;
- based on the normalized factors for each of the plurality of dimensions, generating, via one or more processors, a dimension index for each of the plurality of dimensions in each of the respective plurality of geographical areas;
- determining, via the one or more processors, a dimension weight for each of the plurality of dimensions in each of the respective plurality of geographical areas;
- generating, via the one or more processors, a weighted dimension index for each of the plurality of dimensions in each of the respective plurality of geographical areas by combining the dimension index for each of the plurality of dimensions with the dimension weight for each respective one of the plurality of dimensions;
- generating, via the one or more processors, a general readiness index for each of the plurality of geographical areas based on the weighted dimension index for each of the plurality of dimensions in each of the respective plurality of geographical areas, each general readiness index indicating a level of electronic payment readiness for each respective geographical area;
- determining, via the one or more processors, which of the general readiness indices for each of the plurality of geographical areas exceeds a predetermined threshold index value; and
- providing, via the one or more processors, a graphical user interface (GUI) including an electronic payment readiness map,
- wherein geographical areas with general readiness indices that exceed the predetermined threshold index value are shown on the electronic payment readiness map in a first color, and geographical areas with general readiness indices that does not exceed the predetermined threshold index value are shown on the electronic payment readiness map in a second color different than the first color.

15. The method of claim 14, wherein the dimension index for each dimension of the plurality of dimensions is generated using principal component analysis (PCA).

16. The method of claim 14, wherein general readiness index is generated using principal component analysis (PCA).

17. The method of claim 14, wherein the electronic payment readiness visualization is a readiness map including each of the plurality of geographical areas.

18. The method of claim 14, wherein the color of each geographical region reflects a recommended course of action associated with the respective geographical region.

19. The method of claim 14 further comprising grouping geographical regions having similar general readiness index values into one or more substantially homogeneous clusters.

\* \* \* \* \*